April 15, 1969    P. ELOY    3,438,761
METHOD AND APPARATUS FOR MANUFACTURING FLOAT GLASS
WITH INTERNAL CIRCULATORY BATH HEAT EXCHANGE
Filed Oct. 20, 1966    Sheet 1 of 5

INVENTOR
Pierre Eloy

BY *Spencer & Kaye*

ATTORNEYS

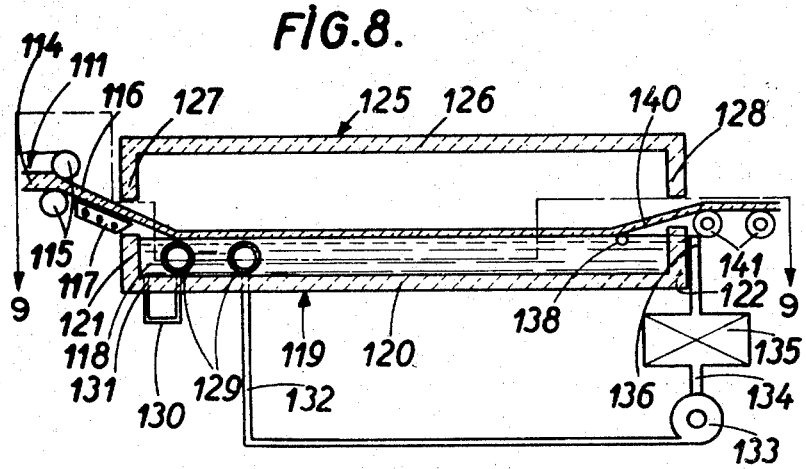
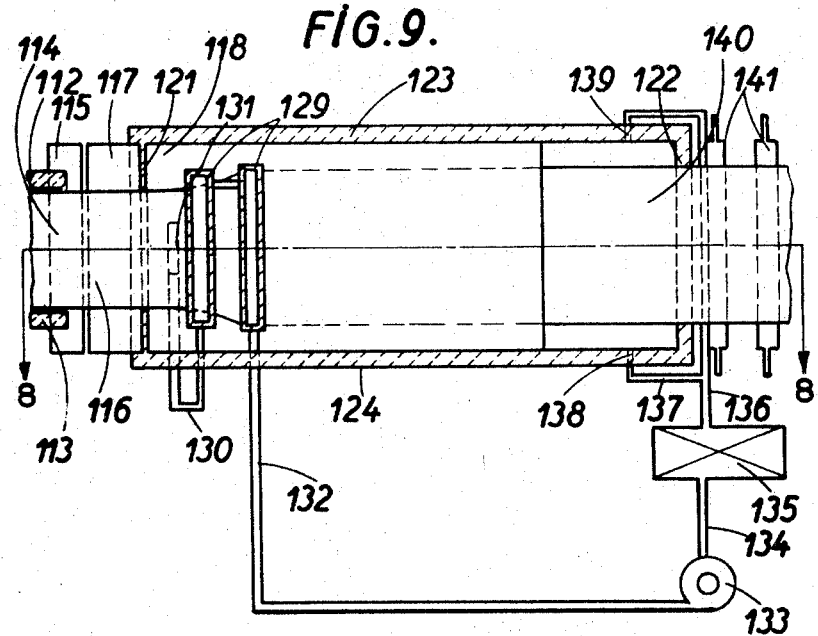

United States Patent Office 3,438,761
Patented Apr. 15, 1969

3,438,761
METHOD AND APPARATUS FOR MANUFACTURING FLOAT GLASS WITH INTERNAL CIRCULATORY BATH HEAT EXCHANGE
Pierre Eloy, Lodelinsart, Belgium, assignor to Glaverbel S.A., Brussels, Belgium
Filed Oct. 20, 1966, Ser. No. 588,059
Claims priority, application Belgium, Oct. 21, 1965, 49,673
Int. Cl. C03b 18/02
U.S. Cl. 65—99
17 Claims

ABSTRACT OF THE DISCLOSURE

Method and apparatus of manufacturing flat glass in which molten or plastic glass is fed onto a bath of molten metal in a tank to form a floating layer and cooled as it moves along the tank to a withdrawal point. Recirculating the molten metal of the bath by means provided therefor, through at least one heat exchanger provided in the tank; the molten metal being recirculated from the colder end portion to the hotter end portion of the bath. Raising the temperature of the recirculated molten metal in the heat exchanger by transferring heat from the contents of the tank to the heat exchanger.

---

The present invention relates generally to the manufacture of glass, and more particularly, to the making of flat glass.

In the well known float process, fluid glass, which is here defined to be molten or plastic glass, is fed onto a bath of molten metal in a tank to form a floating layer which cools as it advances along the tank to the glass withdrawal end. It is customary to continuously remove molten metal from the surface of the bath together with slag and to recirculate this molten metal to the bath via a purifying system which removes the slag. In order to prevent thermal disturbances in the bath which would cause convection currents which are liable to impair the plane-parallelism of the flat glass which is formed, it is necesary to heat the circulating molten metal before it enters the hotter end portion of the bath. Various proposals have been made for accomplishing this reheating.

All of the prior proposals rely upon some form of extraneous heater for heating the molten metal during the flow outside of the tank. The fuel consumption of such extraneous heaters is quite considerable, particularly when the temperature of the molten metal being recycled has to be raised several hunderd degrees centigrade, and the capital cost of the heater is also appreciable.

With this in mind, it is a main object of the present invention to provide for the production of flat glass in a manner which requires less capital expense and is less expensive in operation than in previous arrangements.

It is another object of the present invention to provide for the manufacture of float glass using heat available within the float tank itself for reheating the molten metal.

These objects and other ancillary thereto are accomplished in accordance with preferred embodiments of the present invention wherein molten metal is continuously recirculated from the colder end portion of the bath to its hotter end portion through one or more heat exchangers located in the tank. During its flow through such heat exchanger or exchangers the temperature of the recirculating molten metal is raised by heat transfer from the contents of the tank.

In order to carry out the invention a heat exchanger or exchangers can be located above the floating glass so that the recycling molten metal is heated wholly or mainly by heat radiated from the glass. Alternatively or in addition, a heat exchanger may be immersed in the molten metal bath.

Additional objects and advantages of the present invention will become apparent upon consideration of the following description when taken in conjunction with the accompanying drawings in which:

FIGURE 8 is a vertical sectional view of a fourth embodiment of the invention taken substantially along the plane defined by reference line 8—8 of FIGURE 9.

FIGURE 9 is a horizontal sectional view of the embodiment of FIGURE 8 taken substantially along the plane defined by reference line 9—9 of FIGURE 8.

Figure 1:
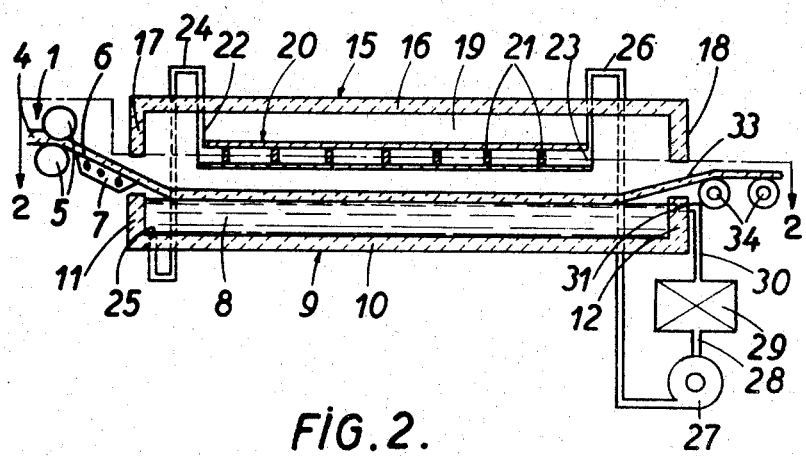
FIGURE 1 is a cross-sectional view of a first embodiment of the present invention taken substantially along the plane defined by reference line 1—1 of FIGURE 2.
Figure 2:
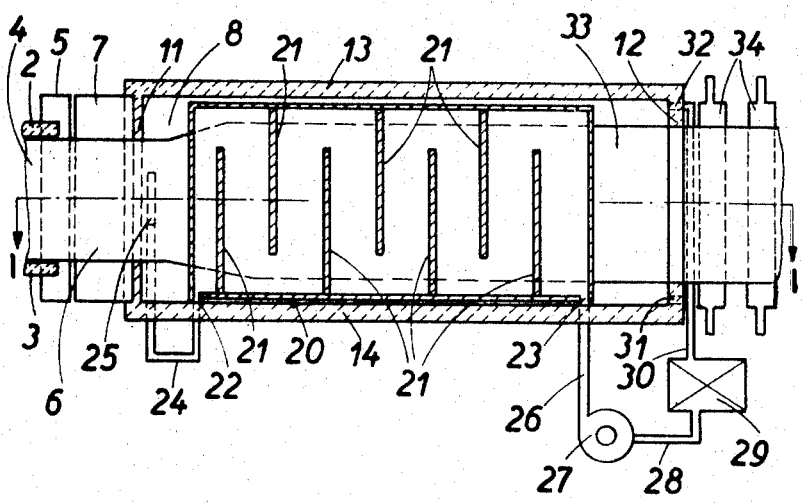
FIGURE 2 is a horizontal sectional view of the first embodiment of the invention taken substantially along the plane defined by reference line 2—2 of FIGURE 1.

With more particular reference to the drawings, the embodiments of FIGURES 1 and 2 show apparatus in accordance with the present invention which is coupled to a glass melting tank furnace 1, only a portion of which is shown in the drawings, that is, its side walls 2 and 3, and this tank furnace 1 channels molten glass 4 to rollers 5. The glass leaves the rollers 5 as a ribbon 6 which slides down an inclined table 7 and is deposited onto a bath 8 of molten metal which is held in a tank 9. This tank 9 is constructed of a bottom 10, an upstream end wall 11, a downstream wall 12, and side walls 13 and 14. A roof structure 15 is provided which includes a crown 16, an upstream end wall 17, and a downstream end wall 18 disposed above the bath of molten metal. The floating glass moves along the tank towards a withdrawal point where it leaves the bath and is subsequently conveyed by transporting rollers 34 to an annealling lehr (not shown).

A heat exchanger in the form of a flat chamber 20 is disposed in the space 19 above the molten metal bath 8, and this chamber 20 is made of molybdenum. The chamber 20 has internal baffles 21, which extend alternately from opposite sidewalls thereof, and is formed with two apertures 22 and 23. The chamber 20 is connected on the one hand to an outflow conduit 24, which leads to an aperture 25 in the tank bottom 10 and, on the other hand, to a delivery conduit 26 which connects the outlet of pump 27 with opening 23. Pump 27 has an intake pipe 28 connected to a purifying device 29. The pump 27 draws molten metal and slag through the purifying device 29 from the downstream end of tank 9. The molten metal and slag leave the tank through outlets 31 and 32 which are disposed on opposite sides of the sheet of floating glass just below the surface of the bath 8 and are conducted to the purifying device 29 by conduit 30.

Due to the flow of molten metal in the surface region of the bath towards the glass withdrawal end, and the continuous recycling of purifying molten metal into the glass feed end of the tank, the glass ribbon 6 does not encounter any slag when it is deposited on the bath of molten metal and the glass spreads out until it reaches the so-called equilibrium thickness without becoming contaminated.

The molten metal withdrawn from the downstream end of the tank by pump 27 is freed from slag in the purifier 29 and, en route back to the bath, this purified metal passes through the heat exchanger 20. During its flow through the heat exchanger, a period which is prolonged by virtue of the lengthened flow-path defined by flow baffles 21, the purified metal exercises a progressive and vigorous cooling action on the glass ribbon 6, and the temperature of such metal is simultaneously raised due to absorption of heat radiated from the glass ribbon 6. By suitably regulating the flow of treated molten metal 8 through the heat exchanger, the thermal conditioning of the glass ribbon 6 can be controlled. By the time the purified metal leaves the heat exchanger its temperature is such that it does not cause undesirable thermal disturbances in the bath when the purified metal is reintroduced therein.

Figure 3:
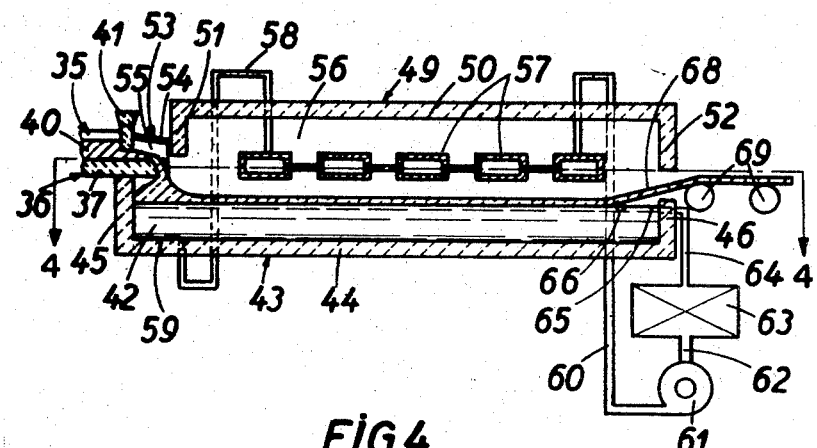
FIGURE 3 is a vertical sectional view of a second embodiment of the invention taken substantially along the plane defined by reference line 3—3 of FIGURE 4.
Figure 4:
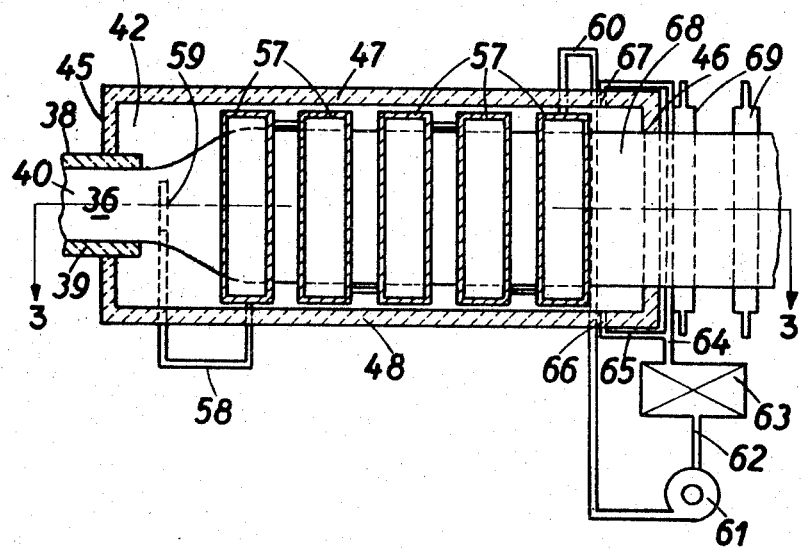
FIGURE 4 is a horizontal sectional view of the embodiment of FIGURE 3 taken substantially along the plane defined by reference line 4—4 of FIGURE 3.

FIGURES 3 and 4 show a portion of a glass tank furnace 35, and the portion which is shown is only the downstream end of its casting lip 36. The casting lip 36 is formed by a bottom 37 and side walls 38 and 39, and channels molten glass 40 via a flow regulating barrier 41 onto a bath 42 of molten metal held in a tank 43. The tank 43 has a bottom 44, an upstream end wall 45, a downstream end wall 46, and side walls 47 and 48. It also has a roof structure 49 (see FIGURE 3) which includes a crown 50, an upstream end wall 51, and a downstream end wall 52. A chamber 53 (see FIGURE 3) is disposed between the roof structure 49 and the regulating barrier 41, and a ceiling 54 and a side wall 55 of the chamber are shown in the drawing.

In the space 56 above the molten metal bath 42 is an assembly of closed chambers or caissons 57 made of molybdenum. The assembly of closed chambers 57 is connected on the one hand to a conduit 58 leading to an aperture 59 in the tank bottom 44 and, on the other hand, to the delivery conduit 60 of a pump 61. The pump 61 has an intake pipe 62 connected to a purifying device 63. The purifying device 63 is fed by way of conduits 64 and 65 leading from outlets 66 and 67 disposed in the side walls 47 and 48 just below the surface of the bath 42 of molten metal.

Adjacent the downstream end wall 46, the sheet of glass 68 rises from the bath of molten metal and is subsequently conveyed by transporting rollers 69 to an annealling lehr (not shown).

This second embodiment of the apparatus according to the present invention operates in a manner similar to the first embodiment, but operates more reliably than the latter because if one heat exchange chamber deteriorates it can easily be replaced, whereas in the first embodiment the apparatus must be put out of operation for a long period if one chamber has to be replaced.

Figure 5:
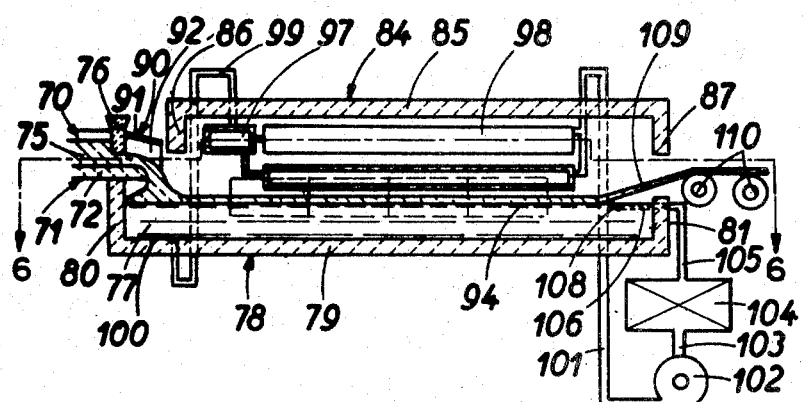
FIGURE 5 is a vertical sectional view of a third embodiment of the invention taken substantially along the plane defined by reference line 5—5 of FIGURE 6.
Figure 6:
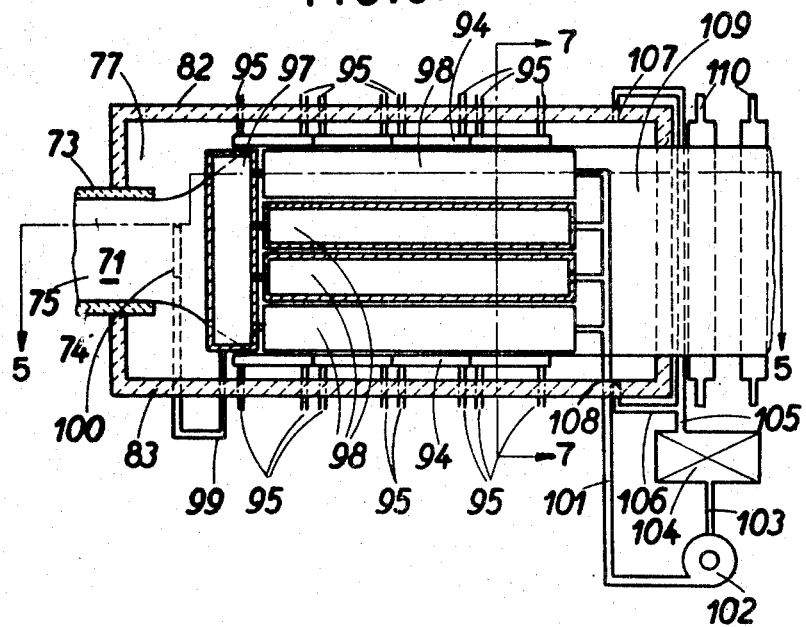
FIGURE 6 is a horizontal sectional view of the embodiment of FIGURE 5 taken generally along the plane defined by reference line 6—6 of FIGURE 5.
Figure 7:
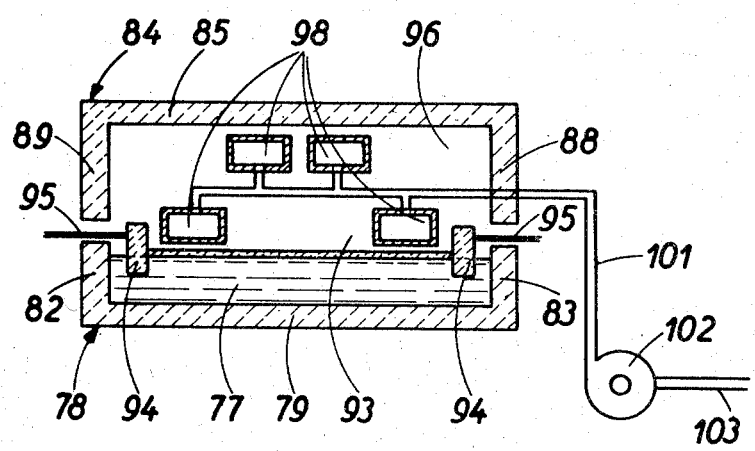
FIGURE 7 is a vertical sectional view of the embodiment of FIGURE 5 taken substantially along the plane defined by reference line 7—7 of FIGURE 6.

FIGURES 5 to 7 show an apparatus according to the present invention coupled to the downstream end of a glass melting tank furnace 70 of which only the casting lip 71 formed by a bottom wall 72 and side walls 73, 74 is shown. Molten glass 75 flows over the casting lip 71 in an amount regulated by a regulating barrier 76 and is then deposited on a bath 77 of molten metal in a tank 78. The lower portion of the tank 78 holding the bath of molten metal 77 comprises a bottom 79, an upstream end wall 80, a downstream end wall 81, and side walls 82 and 83. The upper portion of the tank 78 is a roof structure 84 comprising a crown 85, an upstream end wall 86, a downstream end wall 87, and side walls 88 and 89. Above the glass feed end of the tank there is a cover section comprising a roof portion 91 and side walls 92 only one of which appears in FIGURE 5. The floating glass is raised from the surface of the bath near its downstream end and is conveyed by rollers 110 to an annealling lehr (not shown).

In this third embodiment of the invention the molten glass 75 flowing onto the bath of molten metal spreads out to a width determined by the width of a channeling passage 93 (see FIGURE 7), determined by side guides 94. The guides 94 which are partly immersed in the bath of molten metal, have arms 95 which extend laterally from the tank and by which the guides can be manipulated for varying the width of the channeling passage 93.

An assembly of closed chambers or caissons 97, 98, made of molybdenum and connected in series-parallel is disposed in the tank 78 in the space 96 above the molten metal bath 77. There are four chambers 98 extending in the lengthwise direction of the tank. These four chambers are connected in parallel on the one hand to the conduit 101 leading from pump 102, and on the other hand, to a transverse chamber 97 which acts as a collector adapted to render uniform the temperature of the flow of molten metal arriving from the closed chambers 98. The pump 102 has an intake pipe 103, connected to a purifying device 104 which is fed via conduits 105 and 106 leading from outlets 107 and 108 disposed in the side walls 82 and 83 of the tank 78 just below the surface of the molten metal bath 77. The chamber 97 is connected to a conduit 99 leading to an aperture 100 in the tank bottom 79.

This third embodiment of the apparatus according to the present invention operates similarly to the first embodiment, but has the advantage that the cooling of the layer of molten glass is better distributed over its width. This is due to the arrangement of longitudinal heat exchange chambers 98 with the two outer chambers closer to the flowing glass than the two inner chambers, as can be seen from FIGURE 7.

FIGURES 8 and 9 show a glass tank furnace 111 of which only a portion is shown, this portion being side walls 112 and 113 which channel molten glass 114 to rollers 115. After laying the rollers 115 the glass ribbon 116 slides down an inclined table 117 and is deposited on a bath 118 of molten metal in a tank 119 which comprises a bottom 120, an upstream end wall 121, a downstream end wall 122, and side walls 123 and 124. A roof structure 125 is disposed above the bath 118 of molten metal and includes a crown 126, an upstream end wall 127, and a downstream end wall 128. Adjacent the downstream end wall 122 the sheet of glass 140 is lifted out of the bath of molten metal and is conveyed by transporting rollers 141 to an annealling lehr (not shown).

Inside the tank 119 and immersed in the bath of molten metal are two heat exchange chambers or caissons 129 made of molybdenum and connected together in series. The pair of caissons is connected on the one hand to a conduit 130 leading to an aperture 131 in the tank bottom 120 and on the other hand to the delivery conduit 132 of a pump 133. The pump 133 has an intake pipe 134 connected to a purifying device 135, which is fed via conduits 136 and 137 from outlets 138 and 139 disposed in the side walls 123 and 124 of the tank 119 just below the surface of the molten metal bath 118.

The apparatus shown in FIGURES 8 and 9 has the advantage that the purified molten metal is strongly preheated, even though a smaller and therefore, a more economical heat exchanger is used than in the apparatus shown in the earlier figures.

It is quite possible in carrying out the invention to use in one and the same apparatus, heat exchangers arranged as in FIGURES 8 and 9, together with a heat exchanger or heat exchangers arranged above the molten metal bath as shown in FIGURES 1 through 7.

Thus the present invention provides a heat exchanger for use in performing a method according to the invention which may be simply a conduit or chamber with a heat-conducting wall or walls, whether or not provided with internal baffles to lengthen the flow path of the metal. The heat exchanger or exchangers can be made of a refractory metal such as molybdenum or tungsten. If two or more heat exchangers are used they may be connected in series or parallel or if more than two heat exchangers are used there may be a combination of series and parallel connections.

The transfer of heat to the recirculating molten metal in accordance with the invention will result in a more rapid cooling of the floating glass. The simultaneous and interdependent cooling of the molten glass and heating of the recycling molten metal is favorable to the attainment of a more profitable heat balance for the system.

The form and/or arrangement of the one or more heat exchangers can be selected to achieve a predetermined schedule for the cooling of the glass and the reheating of the recycling molten metal. The volume rate of flow of molten metal through the heat exchanger or exchangers is also a factor which influences the metal heating and glass cooling schedule and by regulating the flow rate such schedule can be regulated in the course of continuous flat glass manufacture e.g., so as to regulate the thermal conditioning of the cooling glass in a required manner.

Aside from the method, the invention includes any apparatus for use in the manufacture of flat glass, which includes a tank which can hold a bath of molten metal for floating a layer of glass from one end of the tank to the other while the glass cools, at least one heat exchanger through which molten metal can be caused to flow and which is located in the tank so that when the apparatus is in use, heat can transfer to the interior of such exchanger from contents of the tank at its hotter end portion, and means for continuously withdrawing molten metal from the cooler end portion of the bath and conveying such withdrawn metal to the hotter end portion of the bath, through such heat exchanger or exchangers.

In conformity with known practice, a purifier for removing slag, by chemical action or otherwise, from the molten metal withdrawn from the tank, is preferably incorporated in the feed-back circuit for such metal.

The position in which a heat exchanger is located in relation to the glass, i.e., whether above the floating glass or below it, clearly makes some difference to the process. Different advantages attach to the different arrangements. If a heat exchanger is located between the floating glass and the crown of the tank, some of the heat normally lost by upward radiation from the glass is utilized for heating the recycling molten metal, and, if the heat exchanger is appropriately formed and arranged, a more uniform cooling of the top surface of the glass takes place. On the other hand, the rate of heat exchange between liquids is generally more rapid than between a gas and a liquid so that in order to reheat the molten metal to a given extent a smaller heat exchanger can be used if it is immersed in the molten metal. Moreover, if the heat exchanger is immersed in the bath, the molten metal in the heat exchanger can generally be heated to a higher temperature and other means for cooling the metal in the bath can be dispensed with. This is not to suggest that a choice has to be made between the different locations of heat exchangers, since heat exchangers located above and below the glass can be used in one and the same process.

Means may be provided in apparatus according to the invention to permit the spacing of a heat exchanger from the floating glass and/or the shape or dimensions of the available flow passage or passages in such heat exchanger to be adjusted in the course of the flat glass manufacture. Another way of permitting adjustments to be made in the course of manufacture is to provide alternative heat exchangers or alternative flow passages in one or more heat exchangers and means for switching the flow of molten glass from one exchanger or passage to another to modify the heat exchange effect. In this way also, the thermal conditioning of the glass during its movement through the tank can be altered as between one region of the floating glass sheet and another, e.g., as between the marginal regions of the sheet and the central region. By providing two or more heat exchangers in parallel, it is moreover possible if appropriate flow control means is provided, to continue operation even if one heat exchanger is rendered inoperative or removed because it needs to be repaired or replaced.

It will be understood that the above description of the present invention is susceptible to various modifications, changes, and adaptations, and the same are intended to be comprehended within the meaning and range of equivalents of the appended claims.

What is claimed is:
1. A method of manufacturing flat glass comprising the steps of:
   feeding fluid glass onto a bath of molten metal in a tank to form a floating layer;
   cooling the floating layer while it moves along the tank to a glass withdrawal point;
   recirculating through at least one heat exchange zone in the tank, molten metal from the colder end portion of the bath to its hotter end portion;
   raising the temperature of the recirculating molten metal in the heat exchange zone by transferring heat from the contents of the tank to the heat exchange zone.
2. A method as defined in claim 1 wherein said temperature raising step is carried on in a heat exchange zone which is disposed in the atmosphere of the tank above the bath.
3. A method as defined in claim 1 wherein said temperature raising step is carried on in a heat exchange zone which is emersed in the bath.
4. Apparatus for use in the manufacture of flat glass, comprising in combination:
   tank for holding a bath of molten metal for floating a layer of glass from one end of the tank to the other while the glass cools;
   at least one heat exchanger through which molten metal is to flow, said heat exchanger being disposed in said tank in order that heat can be transferred from the contents of the tank to the interior of said heat exchanger; and
   means for withdrawing molten metal from the cooler end portion of the bath and for conveying such withdrawal metal to the hotter end portion of the bath through said heat exchanger.
5. Apparatus as defined in claim 4 wherein said heat exchanger is at least partly disposed in the hotter end portion of the tank above the level of the bath.
6. Apparatus as defined in claim 4 wherein said heat exchanger is disposed at least partly in the hotter end portion of the tank and is disposed to be immersed in the bath.
7. Apparatus as defined in claim 4 wherein said heat exchanger is constructed of refractory metal.
8. Apparatus as defined in claim 7 wherein said refractory metal is one selected from the group consisting of molybdenum and tungsten.
9. Apparatus as defined in claim 4 wherein said heat exchanger is a chamber having entry and exit apertures for the molten metal.
10. Apparatus as defined in claim 4 wherein said heat exchanger defines at least one sinuous conduit extending alternately from opposite sidewalls thereof in order to define a lengthened flow path for the molten metal, which path is substantially longer than the distance between its inlet and outlet.
11. Apparatus as defined in claim 4 wherein said heat exchanger is formed by at least two chambers connected so that the molten metal may flow therethrough in series.
12. Apparatus as defined in claim 4 wherein said heat exchanger includes at least two chambers connected so that the molten metal may flow therethrough in parallel.
13. Apparatus as defined in claim 12 comprising means for switching molten metal from one flow path to another during flow through the heat exchanger.
14. Apparatus as defined in claim 4 wherein said heat exchanger includes a group of chambers having parallel and series connections, said chambers defining flow paths for the molten metal.

15. Apparatus as defined in claim 14 comprising means for switching molten metal from one flow path to another during flow through the heat exchanger.

16. Apparatus as defined in claim 4 comprising means for regulating the volume rate of flow of molten metal through the heat exchanger.

17. Apparatus as defined in claim 4 further comprising means for varying the position of said heat exchanger in relation to the plane of the floating glass.

References Cited

UNITED STATES PATENTS

| | | | |
|---|---|---|---|
| 3,231,351 | 1/1966 | Brichard | 65—99 |
| 3,317,301 | 5/1967 | Robinson | 65—99 |

DONALL H. SYLVESTER, *Primary Examiner.*

R. V. FISHER, *Assistant Examiner.*

U.S. Cl. X.R.

65—65, 182, 356